United States Patent [19]

Salomon et al.

[11] 4,178,517
[45] Dec. 11, 1979

[54] PROCESS FOR CONVERSION OF OCEAN WAVE ENERGY INTO ELECTRIC POWER AND APPARATUS

[75] Inventors: Robert E. Salomon, Dresher; Susan M. Harding, Bala Cynwyd, both of Pa.

[73] Assignee: Temple University

[21] Appl. No.: 900,668

[22] Filed: Apr. 27, 1978

[51] Int. Cl.² .............................................. F03B 13/10
[52] U.S. Cl. ......................................... 290/53; 290/42
[58] Field of Search ................................... 290/42, 53

[56] References Cited

U.S. PATENT DOCUMENTS

| | | | |
|---|---|---|---|
| 3,064,137 | 11/1962 | Corbett, Jr. et al. | 290/53 |
| 3,546,473 | 12/1970 | Rich | 290/42 |
| 3,870,893 | 3/1975 | Mattera | 290/53 |
| 3,922,739 | 12/1975 | Babintsev | 290/42 X |

OTHER PUBLICATIONS

"A Hydrogen Electrode in Ice", by Krishnan et al. in the Journal of Physical Chemistry, vol. 70, No. 5, pp. 1595-1597, 1 May 1966.

*Primary Examiner*—Gene Z. Rubinson
*Assistant Examiner*—W. E. Duncanson, Jr.
*Attorney, Agent, or Firm*—Paul & Paul

[57] ABSTRACT

A method and apparatus is provided for direct conversion of ocean wave energy into electric power. The apparatus has no moving parts, and uses wave motion to vary the pressure of hydrogen gas in one of the cavities of a two-cavity chamber. The resulting imbalance of pressures in the cavities is relieved by conduction of hydrogen ions through a protonic conductor separating the cavities, and by conduction of electrons through an external circuit, enabling hydrogen gas to be formed on the low-pressure side of the chamber. The conduction of electrons constitutes a usable electric current. Virtually no hydrogen is consumed in this power generation process.

19 Claims, 4 Drawing Figures

PROCESS FOR CONVERSION OF OCEAN WAVE ENERGY INTO ELECTRIC POWER AND APPARATUS

BACKGROUND OF THE INVENTION

This invention provides an apparatus for direct conversion of ocean wave motion into usable electric power. With the increasing attention given to the search for new sources of energy, the possibility of harnessing the energy of ocean waves becomes more and more tantalizing. Wave motion in the ocean is caused by winds, which in turn are the products of energy from the sun. Using the motion of the waves in the ocean is thus one way of benefiting from the virtually limitless amounts of energy available from the sun.

Attempts have been made to harness the motion of waves to produce electricity. The usual approach has been to devise an apparatus which causes the waves to drive mechanically a conventional turbine or electric generator. An analysis of the operation of such a device was described in an article by M. E. McCormick in "A Modified Linear Analysis of a Wave-Energy Conversion Buoy" which appeared in Ocean Engineering, volume 3, pp. 133-144. But serious practical problems remain with such conventional power generation systems. Both the generator and mechanical coupling required are subject to corrosive attack by the marine environment. The generator and coupling also, of necessity, have moving parts which require frequent maintenance.

The method and apparatus disclosed in the present invention does not involve a conventional generator, but rather comprises an electrochemical gas concentration cell which converts wave motion to electricity directly. The principle of direct conversion has been known on theoretical grounds, although no practical apparatus or method for extracting electrical energy from the ocean is known. The existence of protonic conduction in ice was demonstrated by P. N. Krishman, I. Young, and R. E. Salomon in volume 70, number 5 of the Journal of Physical Chemistry, pp. 1595-97. In this work, it was shown that protons, coming from hydrogen gas, were transported through ice in such a way as to produce a small voltage across the cell. However, the voltages measured were quire small, and the internal resistance of the cell and the resistance of the electrodes were excessively high. The current obtainable was accordingly too small to be of practical use. Also, it is difficult to select and attach electrodes to a protonic conductor, such that the electrodes are non-polarizable, reversible and stable.

SUMMARY OF THE INVENTION

The problems described above are solved by the present invention, one embodiment of which comprises a floating cylinder with one open end submerged below sea level. Dividing the interior of the cylinder into two cavities is a protonic conductor, and a pair of electrodes abutting either side of the protonic conductor. The two cavities within the cylinder, defined by the cylinder walls and the protonic conductor, are filled with hydrogen gas. When an ocean wave causes the water level in the lower cavity to rise, pressure on the hydrogen in the lower cavity is increased and the hydrogen begins to dissociate into protons and electrons. The protons travel through the protonic conductor toward the upper cavity, while the electrons travel through an external circuit from the electrode in the lower cavity to the electrode in the upper cavity. Protons having passed through the protonic conductor into the upper cavity encounter electrons which have traveled through the external circuit. These protons are reduced to form more hydrogen gas in the upper cavity. Thus, the system tends to equalize the hydrogen pressures in the two cavities, and in the process of this equalization, a voltage is developed between the electrodes. When the water level falls, the process is reversed, and the direction of current in the external circuit is also reversed. The current flowing through the external circuit oscillates at the frequency of the ocean wave. Hydrogen is not consumed in this process. Rather, some of the hydrogen is merely transported, in effect, back and forth between the cavities of the cylinder.

In a typical embodiment, the cylinder could be about one meter in radius, in order to work well with ocean waves having a period of about ten seconds, a wave length of about 100 meters and a wave height of several meters. The cylinders would be rigidly anchored at a fixed height above the sea floor, in the form of a taut-moored buoy.

Accordingly, it is a primary object of this invention to provide a method and apparatus for conversion of ocean wave energy directly into electrical power.

It is a further object of this invention to provide an apparatus as described above, wherein the apparatus has no moving parts.

It is a further object of the present invention to provide an apparatus for conversion of wave energy into electric power which comprises an electrochemical gas concentration cell.

It is a further object of the present invention to provide an apparatus for direct conversion of wave energy into electricity comprising a concrete cylinder in the form of a taut-moored buoy.

It is a further object of the present invention to provide an apparatus for conversion of wave energy into electricity, which apparatus is practicable with waves having wave lengths of the order of 100 meters, periods of the order of ten seconds, and heights of several meters.

It is a further object of this invention to provide an apparatus and method for direct conversion of wave energy into electricity, in which neither reactants nor catalysts are consumed or poisoned.

It is a further object of the present invention to provide apparatus as described above, wherein hydrogen gas may be transported to the interface between a protonic conductor and an electrode.

Other objects and advantages of the present invention will be apparent to those skilled in the art from a reading of the following brief description of the drawings, the theory of the invention, the detailed description of the invention, and the appended claims.

THEORY OF THE INVENTION

Figure 1:
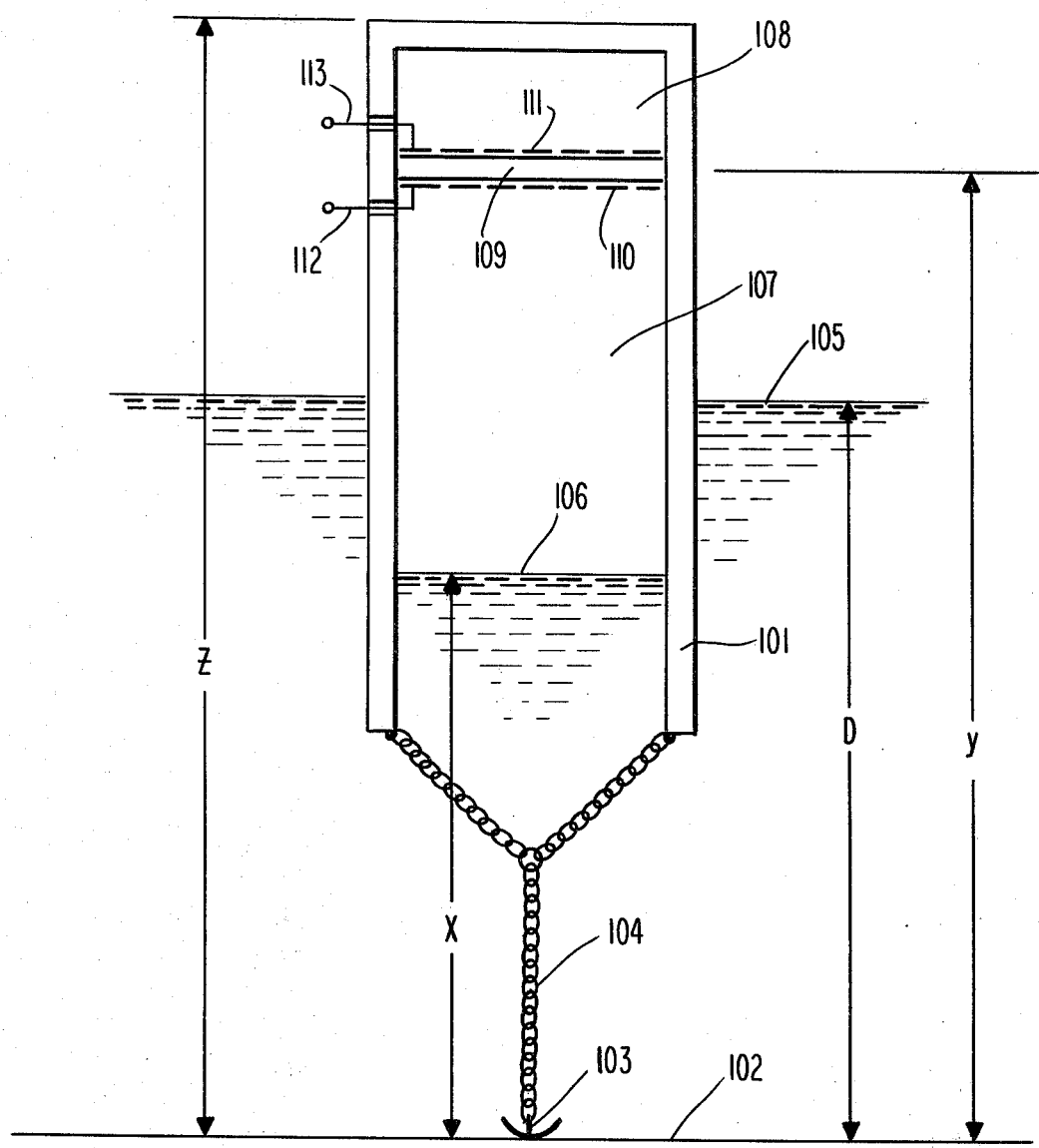
FIG. 1 is a schematic diagram of one embodiment of the present invention.

The theory of operation of the present invention is best explained with reference to the diagrammatic sketch of FIG. 1. FIG. 1 shows an open-ended cylinder 101, which could be made of concrete, floating in the water, and attached to the ocean floor 102 by anchor 103 and chain 104. Sea level is indicated by reference numeral 105, and the water level within the cylinder is indicated by reference numeral 106. Dividing the inside of cylinder 101 into two cavities 107 and 108 is a protonic conductor 109. Attached along either side of protonic conductor 109 are electrodes 110 and 111, connected respectively to wires 112 and 113, respectively. Although the diagram of FIG. 1 does not illustrate the source of hydrogen gas, it is understood that the inside of cylinder 101 has been evacuated, and that cavities 107 and 108 are filled with hydrogen gas.

A cylinder such as 101 could be of the order of one meter in radius in order to work with waves having a period of eight seconds, a wave length of 100 meters, and a wave height of five meters. The dimensions are merely illustrative; many variations are possible. The main requirement in choosing dimensions is that the device not alter the wave profile significantly.

The operation of the invention can be described as follows. A wave causes the sea level 105 to rise, and because cylinder 101 is affixed to the ocean floor 102, water level 106 within cylinder 101 also rises. The rising water level causes the pressure on the hydrogen in lower cavity 107 to increase, and this pressure results in dissociation according to the equation $$H_2 \leftrightarrow 2H^+ + 2e^{31} \quad (1)$$ 

the protons formed by this reaction travel through protonic conductor 109, towards upper cavity 108. At the same time, the electrons formed according to Equation (1) travel through electrode 110, wire 112, through an external load (not shown), through return wire 113, and to electrode 111. Electrons and protons meet each other again in upper cavity 108, and there the protons are reduced to form hydrogen gas, the reverse of the reaction shown in Equation (1). Therefore, the system tends to equalize the imbalance in hydrogen pressures, by transporting hydrogen, in an indirect way, from lower cavity 107 to upper cavity 108. Note that the protonic conductor 109 allows virtually no molecular hydrogen to pass through it, so that the transfer of hydrogen between cavities is almost entirely by means of protonic and electronic conduction. Of course, the flow of electrons through the external circuit, in the process of equalizing the hydrogen pressures, is a potentially usable electric current.

When the water level 106 falls, at the trough of the wave, the process is reversed, and current flows through the external circuit in the opposite direction. The result is a current which oscillates at the frequency of the ocean wave. It is seen that, once the cavities 107 and 108 have been filled with hydrogen gas, no hydrogen is used up in the process, but rather hydrogen is merely transferred from one cavity to the other, and back again.

The voltage available from the device shown in FIG. 1 can be calculated according to the following analysis.

The basic equation giving the voltage available is a form of the Nernst equation, $$Emf = \frac{R_g T}{2F} \ln \left( \frac{P_u}{P_l} \right), \quad (2)$$

where $P_u$ is the pressure in upper cavity 108, $P_l$ is the pressure in lower cavity 107, $R_g$ is the gas constant, F is the Faraday, T is the temperature, and ln indicates the taking of natural logarithms. This equation is similar to that which can be applied to any electrochemical cell; the important point to note is that the emf available from this invention is proportional to the logarithm of the ratio of the pressures in the two cavities. Obviously, if the pressures are equal, this logarithm vanishes, and no emf is available, as is also clear in view of the above descriptive analysis.

The ratio of pressures in the two cavities can be calculated in a straightforward manner. Since the hydrogen gas may be assumed to behave as an ideal gas, the pressure in cavity 108 is given directly by the equation of state for an ideal gas, which is, in this case, $$P_u = \frac{n_u R_g T}{(z - y)K} \quad (3)$$

where $n_u$ is the number of moles of hydrogen in the upper cavity 108, z and y are the dimensions as indicated in FIG. 1, and K is the cross-sectional area of cylinder 101. Similarly, the pressure in lower cavity 107 is given by $$P_l = \frac{n_l R_g T}{(y - x)K} \quad (4)$$

where x is the dimension as shown in FIG. 1. Inserting Equations (3) and (4) into Equation (2), we obtain $$Emf = \frac{R_g T}{2F} \ln \left[ \frac{n_u (y - x)}{(n - n_u)(z - y)} \right] \quad (5)$$

where n is the total number of moles of hydrogen.

Since the cylinder 101 is held in a fixed position, z is a constant. Also, since protonic conductor 109 is held in its place, y is also a constant. Therefore, a knowledge of x at any given time is sufficient to determine the emf produced. One can determine x by noting that the pressure in the lower cylinder 107 is given by $P_o + C(D - x)$ where C is a constant that can be determined by experiment. Equating this latter expression to the known expression for the pressure in cavity 107, we obtain $$P_o + C(D - x) = \frac{(n - n_u) R_g T}{(y - x)K} \quad (6)$$

where D is as illustrated in FIG. 1. One may assume that D can be expressed as $$D = D_o + A \sin \frac{(2\pi t)}{\tau} \quad (7)$$

where $D_0$ is the average depth of the ocean at a given time of day, A is half the wave height, $\tau$ is the wave period, and t is time. Knowing D, one can solve Equation (6) for x, and thus Equation (5) for the voltage can be solved completely. One could also calculate the instantaneous current using the expression $$I = 2F \frac{dn_u}{dt} \quad (8)$$

and also the instantaneous power:

Power=$Emf \cdot I$ (9)

The most serious practical problem in using this invention is the high resistance of most protonic conductors. This high resistance greatly reduces the available emf, and consequently the power available from such a device is reduced accordingly. Although the existence of protonic conduction has been demonstrated, for example in the references of Krishnan et al, cited above, the exact mechanism of protonic conduction is not fully understood. Also, most protonic conductors are not efficient, and it is crucial to the practical operation of this invention that a protonic conductor be found which does not unduly impede the flow of protons. Although protonic conduction is generally not as efficient as conventional electronic conduction, the protonic conductor used in the present invention is considerably more efficient than would have been believed in the past. Most protonic conductors tend to be insulators with respect to conventional electronic current flow. Even with respect to protons, such materials do not approach the degree of conductivity of metals or doped semiconductors, but it does seem that protonic (or ionic) conduction is not particularly sensitive to defects, impurities, and the like in the material.

It is to be understood that this outline of the theory of the invention is not to be deemed to limit the scope of the claims set forth herein. The discussion of the theory is included for purposes of clarity and completeness, but should not be interpreted as negating the presence of other, hitherto undiscovered physical processes in the operation of this invention.

DETAILED DESCRIPTION OF THE PREFERRED EMBODIMENT

Figure 2:
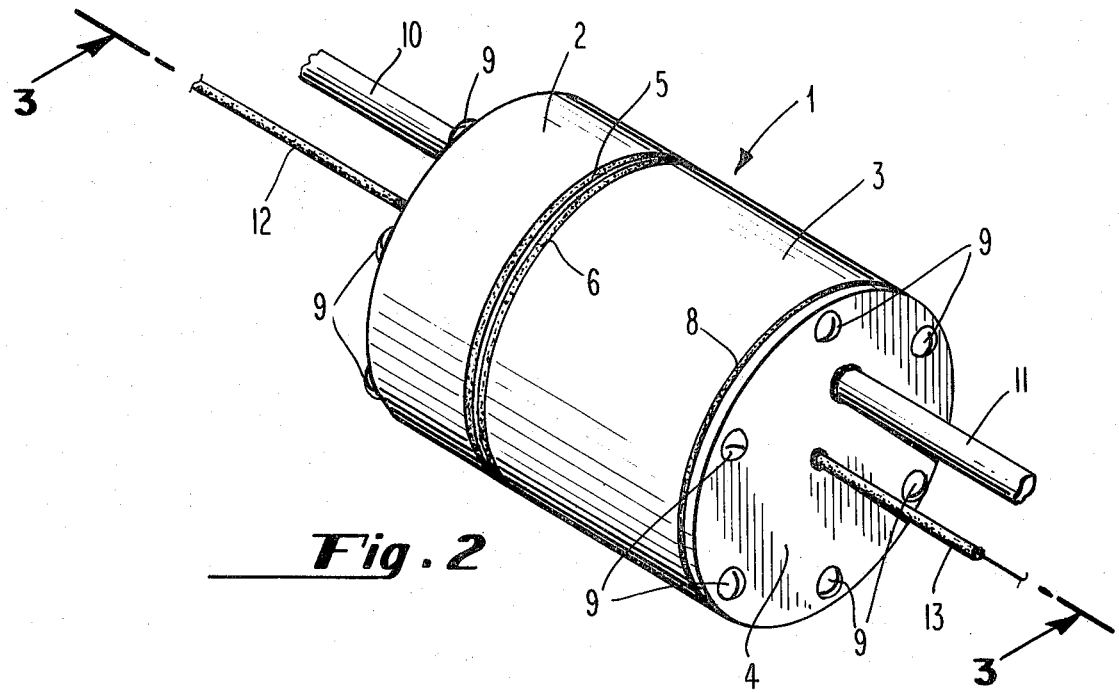
FIG. 2 is a perspective view of the electrochemical gas concentration cell which comprises the preferred embodiment of the present invention.

In FIG. 2 there is shown a perspective view of the electrochemical gas concentration cell which comprises the preferred embodiment of the present invention. Cell 1 is a metal cylinder defined by first section 2 and second section 3, together with end piece 4. Separating the sections 2 and 3 are gaskets 5 and 6. Between gaskets 5 and 6, but not visible in the view of FIG. 2 is a protonic conductor. Separating second section 3 and end piece 4 is gasket 8. Gaskets 5, 6, and 8 are made of Teflon. (Teflon is a registered trademark of E. I. duPont de Nemours & Co.). The entire assembly is held together by screws 9 which fit through appropriately placed holes. Additional holes are provided in the ends of the cylinder to accommodate the electrodes and the hydrogen gas supply. Hydrogen gas enters cell 1 through tubes 10 and 11. Wires 12 and 13 communicate with the protonic conductor, as will be more fully described below.

Figure 4:
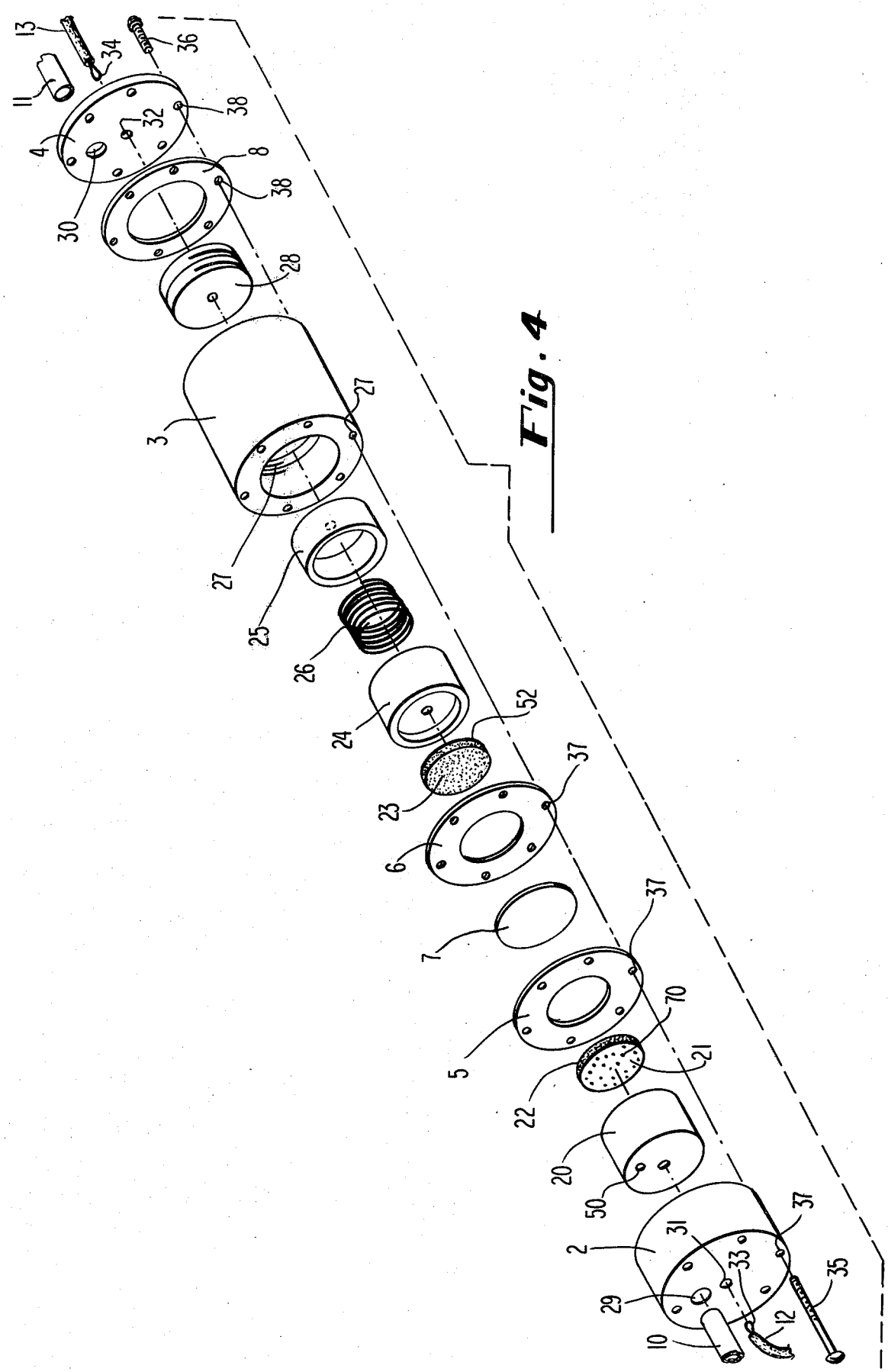
FIG. 4 is an exploded perspective view of the gas concentration cell comprising the preferred embodiment of this invention.

The internal structure of the electrochemical cell is more fully illustrated in the exploded perspective view of FIG. 4. First section 2, second section 3, and end piece 4 of the cylinder are more plainly shown in FIG. 4. Teflon spacer 20 fits within a recess in first section 2 (said recess not being visible in the view of FIG. 4). Spacer 20 presses against fritted glass disc 22. Tin foil 21 has a plurality of perforations 70 which allow hydrogen gas to flow through the foil. The tin foil 21 both facilitates electrical contact with disc 22, and cushions the disc. Disc 22 is manufactured by grinding glass into a fine powder, and heating the resulting material so that the glass fuses again into a porous disc. A liquid preparation containing platinum is then painted all around the fritted disc, and more heat is applied. The result is that platinum completely permeates the fritted disc 22, permitting good electrical contact to be made, as will be described below. Platinum also acts as a catalyst for the dissociation reaction of Equation (1). Gold or palladium could be used instead of platinum, however. The porous quality of the disc 22 allows hydrogen gas to travel freely through the disc.

The tin foil 21 and disc 22 are mounted adjacent to the center hole in Teflon gasket 5. Teflon gaskets 5 and 6 surround protonic conductor 7, shown as a circular membrane. The protonic conductor used in the preferred embodiment is a membrane constructed of a copolymer consisting of the monomers tetrafluoroethylene and perfluoro-3,6-dioxa-4-methyl-7-octensulfonic acid. This copolymer is known by the trademark Nafion 125, said trademark belonging to E. I. duPont de Nemours & Co. More information concerning Nafion can be found in the patent disclosing the substance, U.S. Pat. No. 3,282,875 to Connolly and Gresham. Although Nafion 125 is used in the preferred embodiment, any other protonic conductor which presents sufficiently low resistance to the movement through it of protons may also be used. The Nafion may be corrugated by pressing it against a fritted disc. The corrugations increase the effective surface area of the Nafion, thus providing more locations for the desired reactions to take place. Corrugations thus lower the resistance of the protonic conductor, so that appreciable power may be generated. In this preferred embodiment, the Nafion is 0.005 inches thick, and is very flexible, so that it may easily be corrugated as described above, in order to increase its effective area where it communicates with fritted disc 22 and fritted disc 23. Gaskets 5 and 6 prevent the escape of hydrogen gas through gap 80, and also prevent electrical contact between protonic conductor 7 and either first section 2 or second section 3.

Fritted disc 23 also has a piece of tin foil, not visible in the view of FIG. 4, but similar to tin foil 21 shown on disc 22. Teflon spacers 24 and 25 assist in holding fritted disc 23 in place against protonic conductor 7, and also provide housing for spring 26 which further aids in holding the internal pieces of the cell together. Second section 3 of the cylinder follows, and this section has threads 27 to accommodate threaded spacer 28. Teflon gasket 8 seals the space between second section 3 and end piece 4, so that hydrogen cannot leak out.

Tubes 10, and 11 are shown, fitting into holes 29 and 30, respectively. Also, wires 12 and 13 fit through holes 31 and 32, respectively. Note also the wire loops 33 and 34 which facilitate electrical contact with the internal parts. The entire assembly is fastened together with screws such as 35 and 36. Screws 35 and 36 fit through holes such as 37 and 38, respectively.

Figure 3:
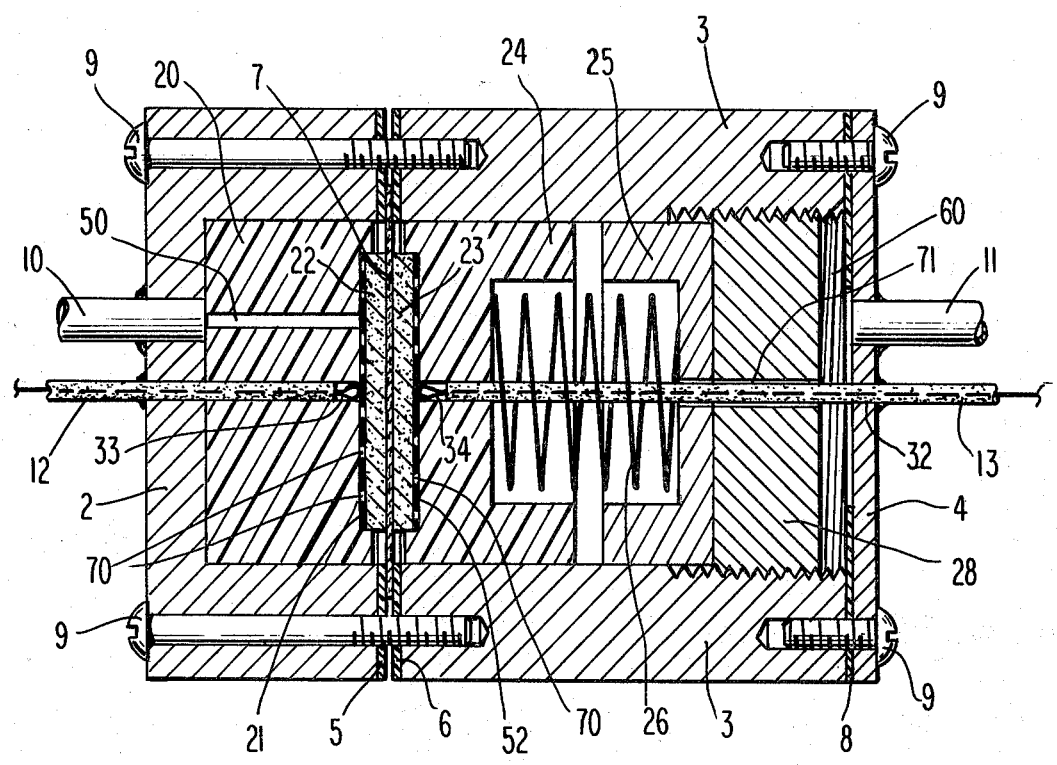
FIG. 3 is a cross-sectional view of the electrochemical cell, taken along the line 3—3 of FIG. 2.

The assembled electrochemical cell is shown in cross-section in FIG. 3. Again visible are first section 2, second section 3, and end piece 4 of the cylinder. Tube 10 communicates with duct 50, allowing hydrogen gas to pass through said duct towards the protonic conductor 7. Wires 12 and 13 extend substantially through the entire length of the apparatus, causing loops 33 and 34 to press against tin foil pieces 21 and 52, respectively. Fritted discs 22 and 23 are shown on opposite sides of protonic conductor 7. Teflon spacers 20, 24 and 25 together with threaded metal spacer 28 fill up most of the remaining space within the cylinder. Spring 26 aids in pressing the pieces of tin foil and the fritted disc against the protonic conductor 7. The apparatus is sealed by gaskets 5, 6, and 8, so that hydrogen gas does not escape from within the cylinder. Screws 9 are shown holding the pieces of the apparatus together firmly.

The operation of the present invention can now be better understood, and the theoretical description suggested in FIG. 1 can be made more precise with reference to the preferred embodiment, as will now be described with reference to FIG. 3. After the inside of the apparatus is evacuated, hydrogen gas is supplied through tubes 10 and 11, and fills the empty spaces within the cylinder. Although the internal spacers etc. fill most of the space within the cylinder, these parts are not too tightly pressed together. Therefore, hydrogen gas experiences no difficulty in traveling through the "cracks," and thus can easily reach the interfaces between the fritted discs and the protonic conductor. One of the tubes, such as tube 10, is then closed so that no hydrogen may enter or leave through that tube. The other tube is connected to a means for varying the hydrogen pressure on the side of the apparatus served by that tube, in this case, tube 11. The means for varying pressure, in the preferred embodiment, is the ocean itself, which, when pressing upward on a taut-moored buoy as suggested in FIG. 1, will cause the pressure of the hydrogen in one cavity of the cylinder to increase. Hydrogen can travel from tube 11 through empty space 60, through channel 71, in which wire 13 lies, and through perforated tin foil 52, to reach fritted disc 23. The increase in hydrogen pressure on the right hand side of the cylinder in FIG. 3 will cause hydrogen to penetrate the fritted disc 23 and to dissociate at or near the interface between the fritted disc 23 and protonic conductor 7. Protons then travel through the protonic conductor, in the direction of the left hand side of the cylinder. Electrons, having been produced in the dissociation reaction, travel through the platinum which permeates fritted disc 23, through wire loop 34 and wire 13, and through an external circuit which leads back through wire 12 and loop 33, arriving at platinized fritted disc 22. These electrons, which have traveled the long path through the external circuit, meet protons which have traveled the short path through the protonic conductor 7, and the protons are reduced in the left hand portion of the cylinder to form hydrogen gas. The net effect is a transfer of hydrogen gas from the right hand side to the left hand side of the cylinder, and an electrical current is generated during this process. Note that molecular hydrogen does not pass directly from one part of the cylinder to the other. When the pressure in the right hand side of the cylinder is reduced, the process described above is reversed and current flows in the opposite direction through the external circuit. The embodiment shown in FIGS. 2-4 illustrates a practical means of achieving the desired connection of electrodes to the protonic conductor, so that the invention illustrated schematically in FIG. 1 will work in practice.

It is found that the platinum used on the fritted discs does not corrode with the passage of time, thus reducing the need for maintenance. Very little platinum is used, because it is "painted" in a very thin layer.

It is to be noted that the schematic sketch of FIG. 1 shows an open-ended cylinder, but that the cylinder shown in the preferred embodiment is closed. While the unitary apparatus suggested by FIG. 1 could be used, it is also possible to provide a separate, open-ended cylinder solely for the purpose of holding hydrogen gas, and having an opening through which hydrogen gas could be transmitted to one portion of an electrochemical cell such as is shown in FIG. 3. Many modifications of this invention are possible within the spirit and scope of the above disclosure. The output of an open-ended empty cylinder, as mentioned above, could be connected in parallel to a plurality of cells such as that shown in FIGS. 2-4. Each such cell might be many times smaller than the size suggested by the embodiment of FIG. 1. These cells could then be easily transported to the main raft or buoy, and easily installed and maintained.

In another variation of the embodiments described above, hydrogen in the open ended cylinder is not in direct contact with the ocean. The cavity would be separated from the ocean by a flexible bellows, thereby precluding loss of hydrogen gas by diffusion. Also, a water-insoluble fluid, less dense than sea water, such as a liquid hydrocarbon, could be used to prevent the escape of hydrogen gas. It is therefore clear that there are many ways of creating the pressure difference required by Equation (2), all within the ambit of this invention.

What is claimed is:

1. A method of conversion of water-wave energy into electric power, comprising the steps of:
    inserting an open-ended chamber having a protonic conductor mounted across the width of said chamber into an undulating body of water, said chamber being inserted to a sufficient depth such that the surface of said body of water defines a substantially gas-tight seal for the open end of said chamber;
    evacuating the inside of said chamber;
    filling the inside of said chamber with hydrogen gas; and
    connecting a load electrically across said protonic conductor.

2. The method of claim 1, further comprising the step of affixing said chamber to the ocean floor, wherein said chamber floats partially submerged on the water surface.

3. A method of conversion of water-wave energy into electric power, comprising the steps of:
    evacuating an enclosed chamber having two cavities separated by a protonic conductor;
    filling said cavities of said chamber with hydrogen gas;
    connecting electrically a load across said protonic conductor; and
    varying the pressure in at least one of said cavities.

4. The method of claim 3, wherein said varying step comprises the steps of:
    inserting an open-ended cylinder into a undulating body of water, wherein the surface of said body of water seals the open end of said cylinder and wherein the undulations of said body of water cause the pressure in said cylinder to vary;
    evacuating said cylinder;
    filling said cylinder with hydrogen gas; and
    conducting said hydrogen gas from said cylinder to one of said cavities of said chamber.

5. The method of claim 4, further comprising the step of affixing said cylinder to the ocean floor, wherein said cylinder floats partially submerged on the water surface.

6. Apparatus for conversion of water-wave energy into electric power comprising:
   a chamber filled with hydrogen gas, said chamber having an open end, said open end being adapted to be sealed by an undulating water surface which surface prevents the escape of said hydrogen gas;
   a protonic conductor material;
   means for attaching said protonic conductor to the inside of said chamber, wherein said attaching means and said protonic conductor divide said chamber into an enclosed upper cavity and unenclosed lower cavity;
   a pair of electrodes electrically connected to either side of said protonic conductor; and
   means for connecting said electrodes to an external electrical load.

7. The apparatus of claim 6, further comprising a pair of fritted glass discs, said discs being impregnated with an electrically conducting material, said discs being positioned to lie flat on either surface of said protonic conductor, said discs being held firmly against said protonic conductor by said attaching means, and wherein said discs are sufficiently porous to permit the passage of hydrogen gas through said discs.

8. The apparatus of claim 7, wherein said electrically conducting material is platinum.

9. The apparatus of claim 7, wherein said electrically conducting material is gold.

10. The apparatus of claim 7, wherein said electrically conducting material is palladium.

11. The apparatus as described in any one of claims 8, 9, or 10, wherein said attaching means comprises at least one electrically insulating filler, said filler occupying space within either of said cavities, wherein said filler is mounted sufficiently loosely to permit hydrogen gas to travel to the interfaces between said discs and said protonic conductor.

12. The apparatus of claim 11, further comprising means for inserting a pair of wires into opposite ends of said chamber and through said filler, wherein said wires achieve electrical contact with said electrically conducting material.

13. The apparatus of claim 12, further comprising a spring means for holding at least one of said discs against said protonic conductor.

14. The apparatus of claim 13, further comprising means for filling both of said cavities with hydrogen gas.

15. The apparatus of claim 14, wherein the sides of said discs facing away from said protonic conductor are covered by pieces of perforated metal foil.

16. The apparatus of claim 15, wherein said protonic conductor comprises a membrane constructed of a copolymer of the monomer tetrafluoroethylene and the monomer perfluoro-3,6-dioxa-4-methyl-7-octensulfonic acid.

17. Apparatus for conversion of water-wave energy into electric power comprising:
   means defining a chamber;
   a protonic conductor connected across the width of said chamber, wherein said chamber and said protonic conductor together define two cavities;
   an electrical load connected to either side of said protonic conductor;
   means for filling both of said cavities with hydrogen gas; and
   means for periodically varying the pressure in at least one of said cavities.

18. The apparatus of claim 17, wherein said varying means comprises an open-ended cylinder, said cylinder being positioned to float in an undulating body of water, wherein said body of water seals the open end of said cylinder, and wherein the pressure in said cylinder varies according to the instantaneous position of the surface of said body of water within said cylinder, said varying means further comprising duct means for conducting hydrogen gas from said cylinder to one of said cavities of said chamber.

19. The apparatus of claim 18, wherein said cylinder is affixed to an ocean floor, and wherein said cylinder is partially submerged in said body of water.

* * * * *